(12) United States Patent
Zeller (10) Patent No.: US 12,409,421 B2
(45) Date of Patent: Sep. 9, 2025

(54) SINTERED POROUS BODY WITH MULTIPLE LAYERS

(71) Applicant: ENTEGRIS, INC., Billerica, MA (US)

(72) Inventor: Robert Zeller, Boston, MA (US)

(73) Assignee: ENTEGRIS, INC., Billerica, MA (US)

( * ) Notice: Subject to any disclaimer, the term of this patent is extended or adjusted under 35 U.S.C. 154(b) by 606 days.

(21) Appl. No.: 17/846,936

(22) Filed: Jun. 22, 2022

(65) Prior Publication Data

US 2022/0410079 A1 Dec. 29, 2022

Related U.S. Application Data

(60) Provisional application No. 63/215,770, filed on Jun. 28, 2021.

(51) Int. Cl.
*B01D 69/02* (2006.01)
*B01D 61/02* (2006.01)
*B01D 67/00* (2006.01)

(52) U.S. Cl.
CPC ........... *B01D 69/02* (2013.01); *B01D 61/027* (2013.01); *B01D 67/00411* (2022.08); *B01D 2221/14* (2013.01); *B01D 2256/22* (2013.01); *B01D 2325/04* (2013.01); *B01D 2325/24* (2013.01)

(58) Field of Classification Search
CPC .............. B01D 67/00411; B01D 69/02; B01D 61/027; B01D 2265/22
See application file for complete search history.

(56) References Cited

U.S. PATENT DOCUMENTS

| | | | |
|---|---|---|---|
| 4,889,630 A | 12/1989 | Reinhardt et al. | |
| 5,814,272 A | 9/1998 | Zeller | |
| 6,117,341 A * | 9/2000 | Bray | B01D 69/1216 |
| | | | 210/488 |
| 6,916,454 B2 * | 7/2005 | Alvin | B01D 71/02 |
| | | | 96/11 |
| 7,112,237 B2 * | 9/2006 | Zeller | B22F 7/002 |
| | | | 55/516 |
| 7,534,287 B2 | 5/2009 | Zeller | |
| 9,370,749 B2 | 6/2016 | Addleman et al. | |
| 2003/0000890 A1 | 1/2003 | Quick et al. | |
| 2003/0051456 A1 | 3/2003 | Alvin et al. | |
| 2006/0003162 A1 | 1/2006 | Losfeld et al. | |
| 2013/0305673 A1 | 11/2013 | Zeller | |
| 2020/0188858 A1 | 6/2020 | Zeller | |

FOREIGN PATENT DOCUMENTS

| | | |
|---|---|---|
| JP | 2004136279 A | 5/2004 |
| TW | 202108344 A | 3/2021 |

* cited by examiner

*Primary Examiner* — Robert Clemente (57) ABSTRACT

Described are porous, sintered metal bodies that include multiple layers made from different metal particles and that may be useful as porous filter membranes, as well as methods of making and using the porous, sintered metal bodies.

19 Claims, 6 Drawing Sheets

SINTERED POROUS BODY WITH MULTIPLE LAYERS

CROSS REFERENCE TO RELATED APPLICATIONS

This application claims the benefit under 35 USC 119 of U.S. Provisional Patent Application No. 63/215,770, filed on Jun. 28, 2021, the disclosure of which is hereby incorporated by reference in its entirety.

FIELD

The disclosure relates to porous, sintered metal bodies that include multiple layers made from different metal particles, that may be useful as filter membranes, and also to methods of making and using the porous, sintered metal bodies.

BACKGROUND

Porous, sintered metal bodies find uses in a variety of industrial applications, including filtering fluids that are used in manufacturing. Many manufacturing processes require extremely pure fluids as raw materials or as processing fluids. For example, many different phases of semiconductor and microelectronic device manufacturing require the use of highly pure gases or liquids as raw materials, and highly pure processing fluids for steps such as cleaning, etching, and other surface preparation steps. To provide highly pure fluids during manufacturing, filters are often used to remove contaminants from fluids immediately before use of the fluid.

The fluid may be in the form of a gas or a liquid, or a supercritical fluid. Supercritical carbon dioxide has a variety of uses in industry, including for cleaning and solvent extraction applications. Highly pure, supercritical carbon dioxide may be used in the electronics and semiconductor manufacturing industries, which require extremely high cleanliness and purity of materials. In one such application, supercritical carbon dioxide may be used to remove photoresist material from surfaces of semiconductor wafers. Commonly, a supply of supercritical carbon dioxide is filtered, prior to use, to be free of particulate impurities at a low-nanoscale level, for example by being filtered to remove particles in a size range of 10 or 20 nanometers, or smaller.

Carbon dioxide ($CO_2$) exists as a supercritical fluid at temperatures and pressures above its critical temperature (31.10° C., 87.98° F., 304.25 K) and critical pressure (7.39 MPa, 72.9 atmosphere, 1,071 pounds per square inch, 73.9 bar). Typical operating conditions for processes of filtering supercritical carbon dioxide include a temperature of over 70, 90, or 100 degrees Celsius, and a pressure over 25, 30, 35, or 40 megapascals (MPa).

Equipment used to process and filter supercritical carbon dioxide must be designed to survive and function at temperatures and pressures required to maintain carbon dioxide in a supercritical state. These conditions are significantly more severe than conditions used for filtering many other types of industrial raw materials or process fluids. Many filtering steps of other fluids occur at ambient or only slightly elevated temperatures, and at pressures that are approximately atmospheric pressure, slightly above atmospheric pressure, or well below atmospheric pressure. Consequently, developing new, useful, and improved methods and equipment for filtering supercritical fluids such as supercritical carbon dioxide can be particularly challenging, because equipment and components such as filter membranes must be stable and durable over a useful operating lifetime at relatively high pressures and temperatures.

SUMMARY

The following description relates to novel and inventive porous sintered bodies, filter membranes, methods of preparing the porous sintered bodies, and methods of using the porous sintered bodies as filter membranes.

The described porous sintered bodies can be effective as filter membranes for filtering a variety of different fluids and over broad ranges of temperature and pressure. The fluid may be a gas, a liquid, or a fluid in a supercritical state. The pressure may be ambient, elevated, or reduced. And the temperature may be ambient, elevated, or reduced. As particular examples, certain currently preferred porous sintered bodies may useful for filtering fluids at relatively high temperature and pressure conditions, as with methods of filtering a supercritical fluid such as supercritical carbon dioxide.

The properties of supercritical fluids may vary during their use and during handling and processing. The fluid may experience phase changes between a liquid, vapor, or supercritical phase, which can produce rapid pressure and temperature changes.

Moreover, a supercritical fluid may be chemically incompatible with materials of a process or with structures of fluid handling systems. A low surface tension of a supercritical fluid can allow the fluid to become infused within a material of a structure of a fluid handling system (e.g., a filter). The infused material may expand rapidly in a manner that may rupture or otherwise damage the structure. A Teflon material that is exposed to supercritical carbon dioxide may absorb the supercritical carbon dioxide, which may then expand rapidly to cause the Teflon to rupture. In other examples, a structure of a fluid handling system may chemically interact a with a supercritical fluid to produce a contaminant that enters the fluids, or to cause a chemical reaction that degrades the structure and generates solid particle impurities. As a single example, trace levels of carbon monoxide (CO) present in supercritical carbon dioxide gas can react with nickel that is a component of a filter membrane, to form solid Ni material via the Ni Carbonyl process.

The filtering equipment that is used for filtering supercritical fluids should be durable at high pressure and temperatures conditions, but are designed to be relatively small, to reduce total cost. Small-diameter piping and flow controls are preferred, including relatively small filtering units and filter membranes. Consequently, a surface area of a filter membrane that is designed for processing a supercritical fluid will typically be small compared to a surface area of a filter that is designed for processing a fluid at a lower pressure condition, at flow rates and fluid viscosities that are very similar. The reduced filter surface area is significant, such as on an order-of-magnitude level. A filter designed to filter water at a few liters per minute would generally have 10 to 100 time more filter media (membrane) than a filter for filtering supercritical carbon dioxide, at a flow rate in the same range. It is therefore expected that the filter used for treating the supercritical carbon dioxide will operate significantly higher differential pressure than the common water filter, which requires a filter having a higher strength, e.g., resistance to physical failure such as bursting due to exposure to a pressure differential across the filter membrane.

Described in the present patent application are porous sintered bodies that can be useful as filter membranes for processing a fluid. The fluid may be a gas, a liquid, or a supercritical fluid, and may be caused to flow through the filter membrane at a high or low temperature (significantly above or below ambient temperature) or at a high or low pressure (significantly above or below ambient pressure). In particular applications, the porous sintered body can be useful as a filter membrane in a system and method used to filter a fluid at an elevated temperature, pressure, or both, e.g., to filter a supercritical fluid such as supercritical carbon dioxide.

In one aspect, the invention relates to a porous membrane. The membrane includes: a first layer comprising coarse metal particles having a particle size of at least 1 micron, and a second layer comprising a combination of sintered metal particles, those particles comprising coarse metal particles having a particle size of at least 1 micron, metal fiber particles, and fine metal particles having a particle size below 200 nanometers.

In another aspect, the invention relates to a method of forming a multi-layer porous membrane. The method includes: preparing a first precursor comprising coarse metal particles having a particle size of at least from 1 micron, preparing a multi-layer precursor by applying a blend of metal particles to a surface of the first precursor, the blend comprising coarse metal particles having a particle size of at least 1 micron, metal fiber particles, and fine metal particles having a particle size below 200 nanometers. The method further comprises sintering the composite precursor.

In yet another aspect, the invention relates to a tubular porous membrane that includes: a first layer comprising sintered metal particles, and a second layer comprising a combination of sintered metal particles comprising metal fiber particles. The membrane has a hoop stress at burst that is at least 30,000 psi.

DETAILED DESCRIPTION

Presently described are novel porous, sintered metal bodies (e.g., "porous bodies," "porous sintered bodies," or sometimes simply "bodies" herein) that can be useful as filter membranes for filtering a flow of a fluid, to remove an impurity from the fluid.

A porous sintered body as described is in the form of a porous, metal body that contains two (at least) layers made of sintered metal particles: a first layer that is derived mostly or entirely from coarse metal particles, and a second layer that is derived from a blend of metal particles that includes coarse metal particles, fine metal particles, and metal fiber (referred to herein as "metal fiber particles"). Each layer is made of a matrix of metal particles that have become interconnected at surfaces of the particles by a sintering step.

The first layer functions substantially as a structural base of support for the multi-layer membrane, and exhibits good flow properties and sufficient strength and structure to support the second layer. The second layer functions as a filter membrane layer and as a strengthening layer. To provide both the strength and the filtering function, the second layer contains three types of particles (coarse, fine, and fiber) that combine to form a second layer that performs the filtering functionality, and increases strength of the multi-layer membrane. Coarse particles in the second layer provide a porous structure within which the fine particles and the metal fiber particles are contained. The fine particles of the second layer provide effective filtering of a fluid passing through the porous body. The metal fiber particles have an elongate shape and a length that extends throughout the layer to bond with a number of other particles of the layer to increase the strength of the second layer and of the entire (multi-layer) porous sintered body. The increased strength can be found in a multi-layer membrane that has a cylindrical (tubular) shape, as an increased amount of endurance to hoop stress without fracturing.

Also described are novel and inventive methods for preparing a porous sintered body as described, and novel and inventive methods of using a porous sintered body as described for filtering a flow of fluid.

A porous sintered body as described is a porous metal structure that includes a metal matrix (or simply "matrix") that is derived from and therefore is referred to as "including" (e.g., comprising, consisting of, or consisting essentially of) metal particles that have been connected together (e.g., "interconnected") at their surfaces by a step of sintering the particles. The particles are fused or bonded together to form the interconnected matrix by a step of sintering a precursor body that contains the metal particles in an un-sintered, optionally compressed condition.

The term "sintering" as used herein has a meaning that is consistent with the meaning that this term is given when used in the arts of porous sintered metal structures, such as porous sintered metal membranes of the type that may be useful as a metal filter membrane. Consistent therewith, the term "sintering" can be used to refer to processes of bonding (e.g., "welding" or "fusing") together a collection of small metal particles of one or more different types (sizes, compositions, shapes, etc.) by applying heat to a non-sintered body that includes the particles (e.g., a "precursor") so that the particles reach a temperature that causes the particles to become fused together, i.e., welded together, by a metal bond between surfaces of two different adjacent particles, but that does not cause any of the particles to melt, i.e., none of the metal particles reaches its melting temperature or becomes a flowable liquid.

As used herein, a "sintering point" or "sintering temperature" of a metal particle is a temperature at which the metal particle is capable of being sintered, i.e., a temperature at which particles within a collection of particles with contacting surfaces can be fused together without melting, at a particular pressure such as at atmospheric pressure. A sintering point of metal particles is normally below a melting temperature of the particles, meaning the temperature at which the metal becomes liquid.

Preferably, all or substantially all of the metal particles used to prepare a porous filtered body of the present description will be capable of sintering without melting, at a single temperature that can be used in a sintering step. All of the different types of metal particles used to prepare the porous body can have a sintering temperature that is within a relatively close range, such a range of 5, 10, or 20 degrees Celsius. The range can cover temperatures that are typical of sintering temperatures of known metal particles, such as temperatures that are above 700, 800, or 900 degrees Celsius.

Also preferably, all or substantially all of the particles used to prepare a porous filtered body as described will have a similar coefficient of expansion, with the particles having coefficients of expansion that are the same or that are all within a relatively narrow range.

Non-limiting examples of metal particles that can be useful as any of the different types of metal particles of a first layer or a second layer of a body include metal particles made of any metal (which includes pure metals and alloys), for example stainless steel, another iron or steel alloy, nickel or a nickel alloy, titanium or titanium alloy, etc. According to specific example membranes, most or all particles of the different layers of a body are made of a single type of metal, such as stainless steel. For certain applications, e.g., for a sintered body used as a filter membrane for filtering a supercritical fluid such as supercritical carbon dioxide, useful or preferred filter membranes may be made substantially or entirely of stainless steel, which may be favored over other metals, particularly over nickel or nickel alloys, because carbon dioxide contains trace amounts of carbon monoxide that can react with nickel in a manner that produces impurities that will be introduced into a fluid that passes through the body.

A porous sintered body as described, as well as precursors thereof, include two identifiable portions or "layers" made from different metal particles. Without limiting the function of the different layers, a "first" layer is sometimes referred to herein as a "coarse layer" or a "support layer," and a "second" layer is sometimes referred to as a "fine layer" or a "filtering layer." The first layer is made from mostly or entirely coarse metal particles. The second layer is made using a blend of metal particles that includes: coarse metal particles, fine metal particles, and metal fiber particles. A precursor body (non-sintered) used to prepare the porous sintered body also contains two layers made with the different types of metal particles.

The two different layers may be detected visually, using magnification. The first layer, made using mostly or entirely coarse particles will be viewable as containing only or mostly coarse particles bonded together at particle surfaces by a sintering step. The first layer will have a relatively high porosity relative to the second layer.

The second layer made with a mixture of coarse particles, fine particles, and metal fiber particles will be viewable as containing all three of the coarse particles, fine particles, and metal fiber particles, bonded together at particle surfaces by a sintering step. The second layer will have a relatively lower porosity compared to the first layer.

Figure 1:
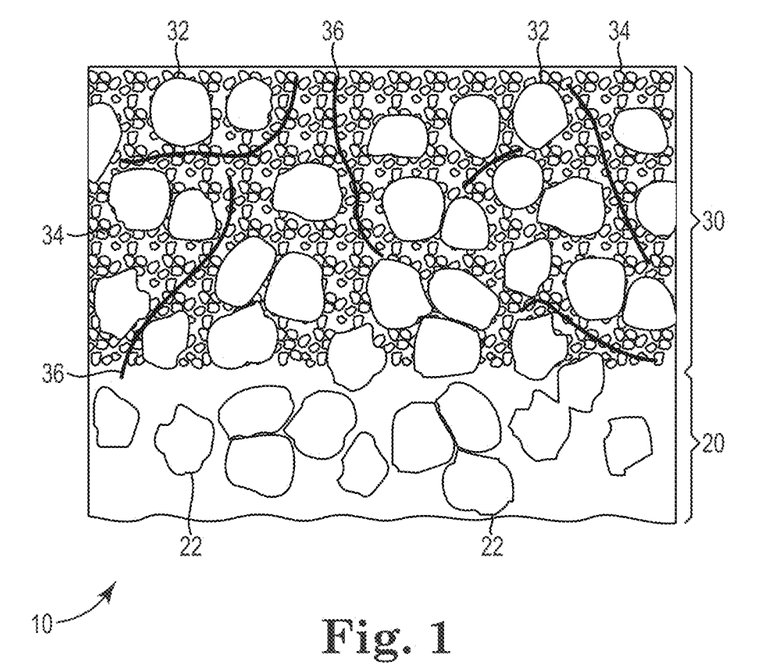
FIG. 1 is a schematic illustration showing a cut-away view of an example porous metal body as described. This schematic illustration is illustrative, and not necessarily to scale.
Figure 2A:
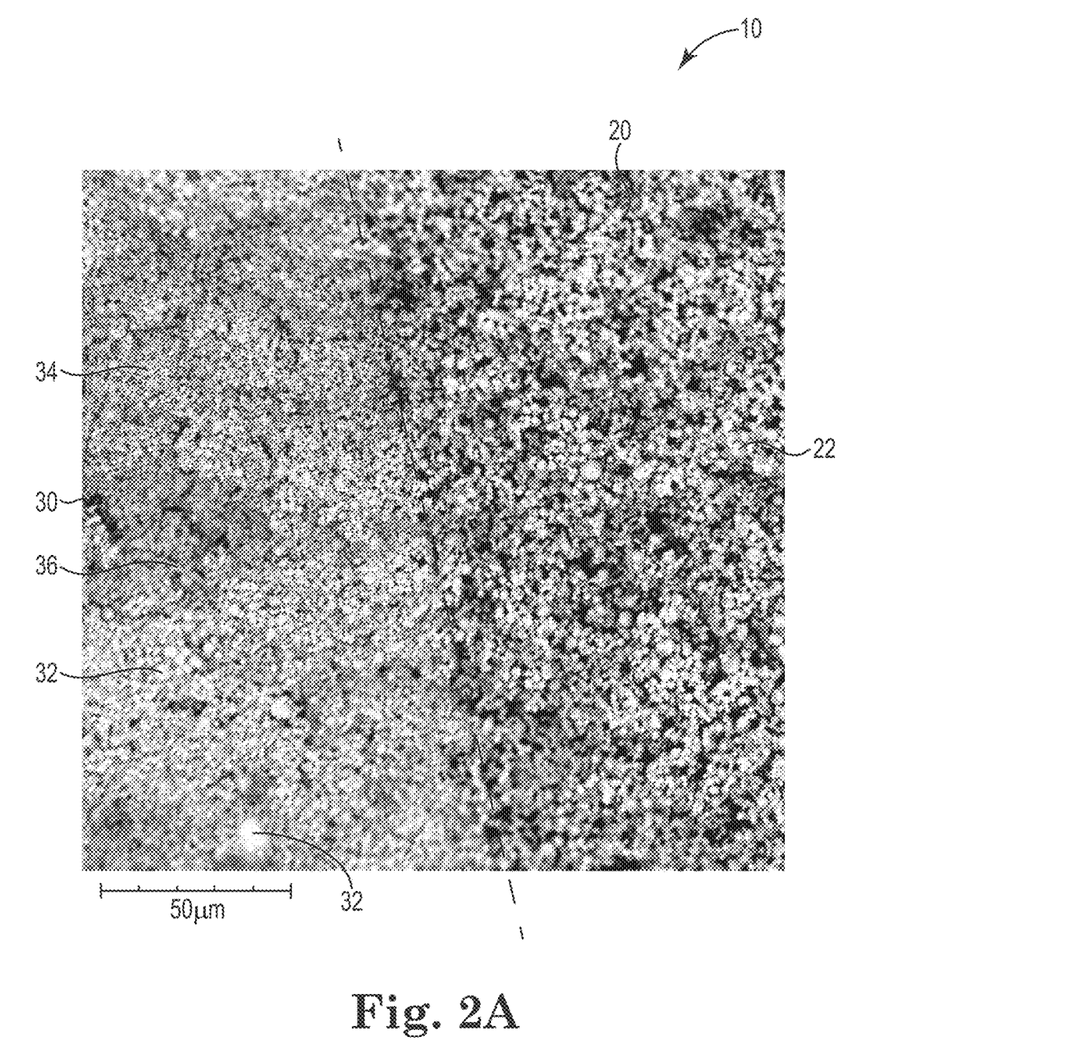
FIGS. 2A, 2B, 2C, and 2D are photomicrographs of an example porous metal body as described.
Figure 2B:
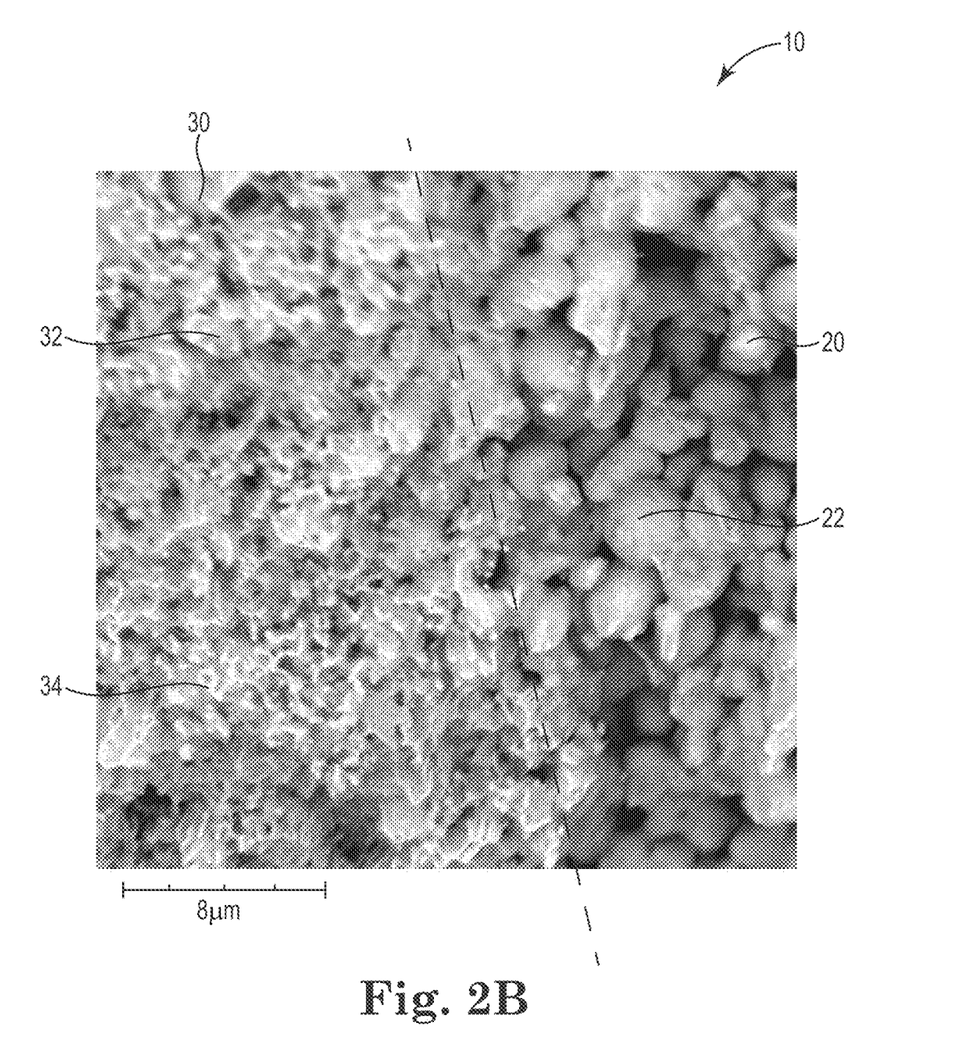
Figure 2C:
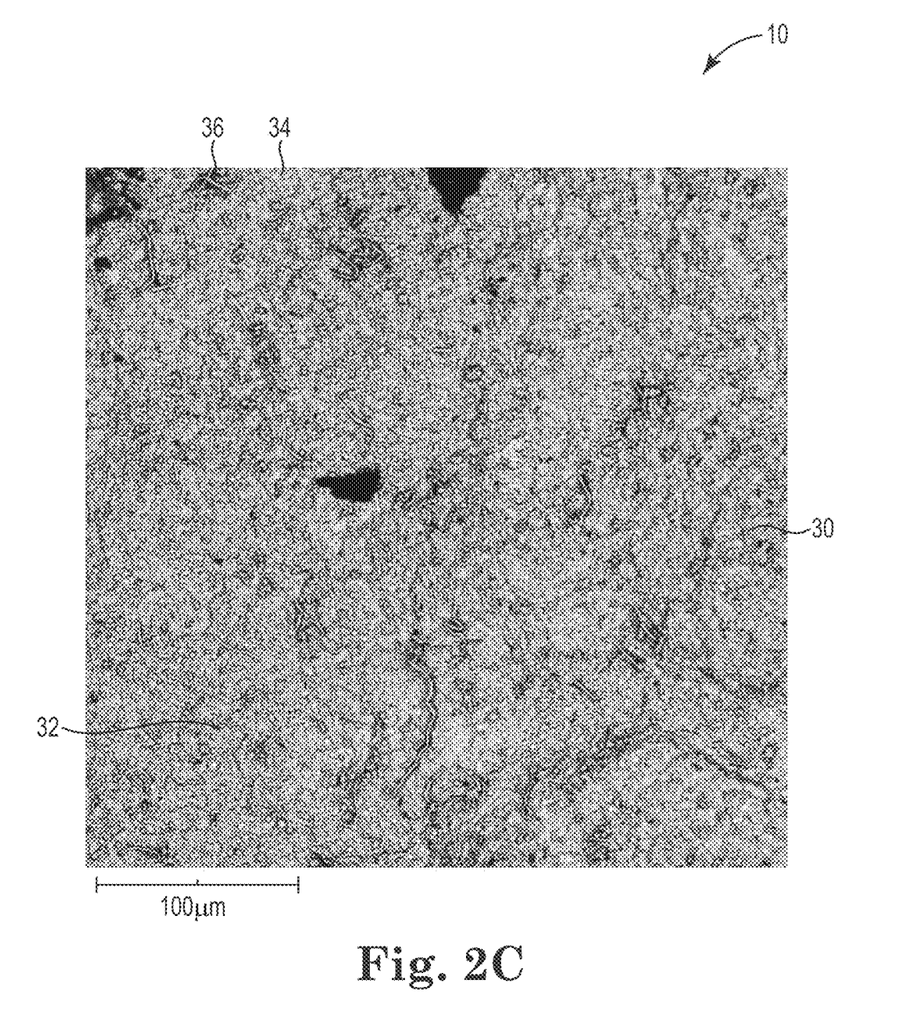
Figure 2D:
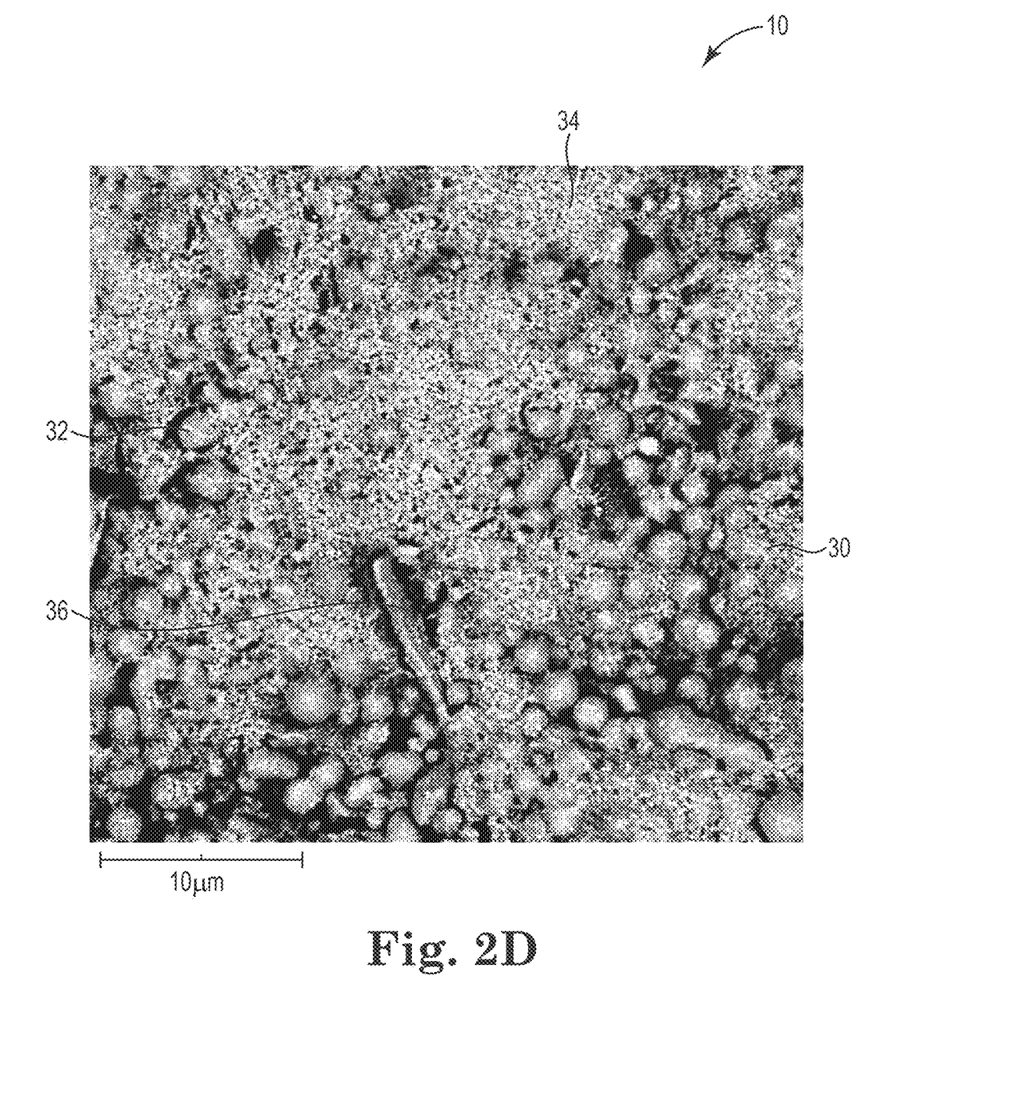

FIG. 1 schematically shows a side, cut-away view of a portion of a porous sintered body. Body 10 includes first layer 20 made mostly or entirely of coarse particles 22. Body 10 also includes second layer 30 made mostly or entirely of coarse particles 32 (the same as or different from coarse particles 22), fine particles 34, and metal fiber particles 36. The particles when formed into a porous sintered body are interconnected at surfaces of the particles.

FIGS. 2A, 2B, 2C, and 2D are photomicrograph images of a porous sintered body schematically shown at FIG. 1. Pictured are body 10, first layer 20 made mostly or entirely of coarse particles 22, and second layer 30 made mostly or entirely of coarse particles 32 (the same as or different from coarse particles 22), fine particles 34, and metal fiber particles 36. The particles when formed into a porous sintered body are interconnected at surfaces of the particles.

In a multi-layer body as described, the first layer, sometimes referred to herein as a "coarse layer," is made mostly or entirely from metal particles that are relatively large compared to some other particles used to prepare the porous metal body. The first layer has a relatively high porosity compared to the porosity of the second layer of the porous body, to allow for effective flow of fluid through the porous body while providing a rigid support for a second layer.

Example coarse metal particles are in the form of a powder, meaning a collection of small (micron or submicron scale) particles of the same or different types. The coarse metal particles used to produce a first layer can have shapes and sizes that allow for the particles to be useful in forming a first layer as described, based on methods as described, that will be effective for the particles to form a porous sintered metal body upon sintering.

The shapes of coarse metal particles can include shapes or surfaces that may be of regular (e.g., consistent within a powder) or irregular, such as round or spherical, globular, branched, or preferably dendritic. In particular examples, coarse particles of a first layer may be of the type referred to as highly anisotropic dendritic particles, such as those described in U.S. Pat. No. 5,814,272 ("the '272 patent"), the entirety of which is incorporated herein by reference.

According to the '272 patent, and as used herein, the term "dendritic" refers to a highly anisotropic, irregular morphology of metal particles wherein the metal particles have a structure that includes one or typically multiple filaments or branches, each filament or branch individually having one dimension (out of three dimensions) that is greater than the other two dimensions of the filament. The one or more branches or filaments may independently be straight or bent, and may be branched or unbranched. Dendritic particles are characterized by low packing efficiencies compared to particles of more regular morphology and, therefore, form powders of lower apparent density compared to powders formed by particles having the same chemical composition but a more regular morphology. Under magnification, dendritic particles can appear as aggregates or agglomerates of non-dendritic starting particles. See FIG. 6 of the '272 patent.

Dendritic powders form self-supporting precursor bodies (e.g., green forms, see infra) and sintered bodies of relatively lower density and higher porosity compared to precursor bodies and sintered bodies made of comparable non-dendritic powders.

Dendritic particles may be formed by fusing together non-dendritic particles or partially-dendritic particles that are part of a collection of particles such as a powder. In brief, powders of dendritic particles can be formed by methods described in the '272 patent. Accordingly, a powder of dendritic particles may be formed from a substantially non-dendritic powder by heating the non-dendritic powder under conditions that are suitable for initial stage sintering, to form a lightly-sintered material. The lightly-sintered material can then be processed to break apart some of the sintered and bonded particles, to form dendritic particles. These steps may be repeated if desired.

The term "lightly sintered material" refers to a material created by the fusion of metal powder particles through an initial stage of sintering, as defined by Randall (Randall in "Powder Metallurgy Science", second edition, German, ed., Metal Powder Federation Industry (1994), the contents of which are incorporated herein by reference). In an initial stage of sintering, or short-range diffusional sintering, bonds form between particles at the particles' contacting surfaces, resulting in the fusion of metal powder particles with their immediate neighbors only. Thus, the initial stage of sintering yields a brittle structure of low mechanical strength. For a given material, sintering proceeds slowly beyond this initial stage at temperatures at the lower end of the material's sintering range. For the purposes of the present description the term "initial stage sintering" refers to the sintering of a powder under conditions in which sintering does not proceed substantially beyond the initial stage.

The term "substantially non-dendritic powder" refers to a powder that contains mostly or entirely (e.g., at least 80, 90, or 95 percent by weight) metal particles that have a non-dendritic morphology.

Coarse particles for use in a first layer can have any particle size (average particle size) that will provide for a first layer of a porous sintered body as described. For example, an average particle size of coarse particles may be at least 1 micron, such as an average particles size in a range from 1 to 20 microns, e.g., from 1 to 5, 10, or 15 microns, or in a range between about 2 and 5 microns. Particle size of metal particles can be measured by ASTM B822-17 (Standard Test Method for Particle Size Distribution of Metal Powders and Related Compounds by Light Scattering). A powder of coarse metal particles that may be useful for preparing a first layer may have any useful apparent density (AD). A powder having a relatively low AD can typically be preferred for producing a first layer that will exhibit a relatively high porosity, to allow for reduced resistance to fluid flow through the porous body. For example, a powder of coarse metal particles used to produce a first layer may have an apparent density that is below 2 grams per cubic centimeter (g/cc), e.g., below 1.5 g/cc, for example in a range from 1.0 to 1.5 grams per cubic centimeter.

An apparent (bulk) density of a powder or granules (e.g., metal particles) refers to the mass of the powder or collection of granules for a given volume, with the volume including intermediate and open spaces between individual granules that make up the powder. Methods for measuring apparent (bulk) density are well known, and include ASTM B703-17 "Standard Test Method for Apparent Density of Metal Powders and Related Compounds Using the Arnold Meter."

According to example sintered metal bodies, a first layer of the body can be prepared from, and therefore can include (comprise, consist essentially of, or consist of), mostly coarse metal particles, e.g., at least 80, 90, 95, or 99 percent by weight coarse particles as described herein, based on total weight of all metal particles of the first layer. A first layer may optionally contain other types of particles, e.g., at low amounts, but in certain examples of first layers other types of particles (particles that are not "coarse particles" as described) may be mostly or entirely excluded and the first layer may be considered to consist of or to consist essentially of coarse particles. As described herein, in a general sense, a composition that is described as "consisting essentially of" a material or combination of materials is a composition that contains the identified material or combination of materials and not more than an insignificant amount of any other material, e.g., that contains the identified material or combination of materials and not more than 5, 3, 1, 0.5, or 0.1 weight percent of any other material. As a specific example, a composition (powder) or a layer that consists essentially of coarse metal particles is a composition or layer that contains the coarse metal particles and not more than 5, 3, 1, 0.5, or 0.1 weight percent of any other material.

A porous sintered body, and the first layer thereof, may have a porosity that will allow the porous sintered body to be effective for a desired use, e.g., as a filter membrane. For use as a filter membrane, especially for use in filtering a flow of fluid at a desired flow rate, a first layer of a porous sintered body as described can preferably have a porosity of at least 40 percent, e.g., a porosity in a range from 40 to 60 percent.

As used herein, and in the art of porous sintered bodies, a "porosity" of a porous sintered body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

The second layer of the porous sintered body, sometimes referred to herein as a "fine layer," is made mostly or entirely from a blend of three types of metal particles. The particles include: coarse metal particles, fine metal particles, and metal fibers (referred to herein as "metal fiber particles"). In very general terms, and without wishing to be bound by any theory, the different types of particles are believed to work together to form a second layer of the body that functions to provide both filtering functionality and increased strength to the multi-layer porous sintered body. Coarse particles in the second layer provide a porous base structure within which the fine particles and the metal fiber particles are contained. The coarse particles provide desired porosity that does not unduly restrict a flow of fluid through the porous body, as well as spaces between the coarse particles for the fine particles to be located to perform a filtering function. The fine particles provide effective filtering of a fluid passing through the porous body. The metal fiber particles have an elongate shape that when included as part of a matrix of the second layer extends along that length and contacts and bonds with a number of other particles of the matrix to increase the strength of the second layer and of the entire (multi-layer) porous sintered body.

Metal particles that can be useful as coarse metal particles of a second layer may be particles of the types generally and specifically described above with respect to the coarse particles of the first layer. The coarse particles of the second layer may be any of the different types, sizes, and shapes of coarse particle described supra. The coarse particles of the second layer may be made of any useful metal material. In certain examples, the coarse particles of the second layer may be the same composition as the coarse particles of the first layer, e.g., stainless steel.

Example coarse particles of the second layer can be dendritic or non-dendritic. Example non-dendritic particles may have an apparent density of at least 2 grams per cubic centimeter (g/cc), e.g., in a range from 2 to 3 g/cc.

Example coarse particles of a second layer can have an average particle size of at least 1 micron, such as an average particles size in a range from 1 to 20 microns, e.g., from 1 to 5, 10, or 15 microns, or in a range between about 2 and 5 microns.

Additionally, the second layer contains fine particles that have a substantially smaller size relative to the coarse particles of the second layer, e.g., are on a scale of nanometers. The fine particles, when present as part of the second layer, are effective to perform a filtration function to remove very small (e.g., micron-scale or nanoscale) impurities or contaminants from a flow of fluid through the second layer.

The fine metal particles are in the form of a powder, meaning a collection of small (nanometer-scale) particles of the same or different types. The fine metal particles used as part of a second layer can have shapes and sizes that allow for the particles to be useful in forming a second layer as described, based on methods as described, that will be effective for the particles to form a porous sintered metal body upon sintering. Examples of useful fine particles can be generally round, non-high-aspect ratio particles of a nanoscale size range. The particles are typically rounded, non-dendritic, and do not exhibit a high aspect ratio, e.g., exhibit an aspect ratio below 10, below 5, or below 4 or 3 on average.

Fine particles for use in a second layer can have any particle size (average particle size) that will provide for a second layer of a porous sintered body as described, particularly with good filtering performance and good flow properties. An average particle size of fine particles may be at below 200 nanometers, such as an average particles size in a range from 25 or 50, to 150 or 200 nanometers, e.g., in a range from 60 to 100 nanometers. Particle size of fine particles can be measured using ASTM B822-17 (Standard Test Method for Particle Size Distribution of Metal Powders and Related Compounds by Light Scattering).

A third type of metal particle that is included in the second layer is metal fiber particles. The metal fiber particles, when present as part of the second layer, are effective to bond to multiple coarse or fine particles of the second layer, over a distance along a length of the metal fiber particles, in a manner that will add strength to the second layer. The metal fiber particles physically contact and directly and indirectly connect with a large number of other particles in the fine layer to form a strengthened fused matrix of metal particles. The fine layer becomes the stronger layer of the membrane, relative to the coarse layer, which functions more as a porous base or a scaffold on which the fine particles can be supported and perform a filtration function.

Metal fiber particles generally are particles that have an elongate axis and a length that is substantially greater than a diameter. Metal fiber particles may be considered to have the form of a "fiber" (a.k.a. "strand," "pillar," "filament," "thread," or the like). The metal fiber particles can have a shape that allows for their use in a second layer as described, and in methods as described, with the metal fibers being included in a porous sintered body by extending along the length of the fiber, through the porous sintered body, and being connected to multiple other particles of the second layer to form a highly connected matrix. The metal fiber particles are elongate, may have an aspect ratio (ratio of length to width) that is at least 25:1, e.g., at least, 50:1, for example in a range from 50:1 to 300:1.

Example thicknesses (cross-sectional diameter, which includes dimensions of width and thickness relative to a substantially longer length) of metal fiber particles can be on a scale of microns, for example, metal fiber particles may have an average thickness (diameter) that is below 10 microns, such as in a range from 1 to 5 microns, e.g., from 1 to 2 or 1 to 3 microns. Example lengths (e.g., average lengths) of metal fiber particles can be on a scale of microns, e.g., tens of microns, such as in a range from 50 to 300 microns, or from 75 to 150 microns. Dimensions of metal fiber particles of a second layer can be determined directly, for example using a scanning electron microscope (SEM).

A second layer may have a porosity that will allow the porous sintered body to be effective for a desired use, e.g., as a filter membrane. For use as a filter membrane, especially for use in filtering a flow of fluid at a desired flow rate, a second layer of a porous sintered body as described can have a porosity in a range from about 15 to about 30 percent.

The second layer can be made using any effective relative amounts of the coarse particles, the fine particles, and the metal fiber particles. In certain example bodies a second layer can be made of from 30 to 70 or from 40 to 60 weight percent coarse particles, from 30 to 70 or from 40 to 60 weight percent fine particles, and less than 20 weight percent metal fiber particles, e.g., less than 15 or 10 weight percent metal fiber particles, such as from 0.5 to 8 weight percent or from 1 to 6 weight percent metal fiber particles, based on total weight of the second layer.

The second layer may optionally contain other types of particles, e.g., at low amounts, but may preferably contain mostly or entirely a blend of the coarse particles, the fine particles, and the metal fiber particles, and may be considered to consist of or to consist essentially of the described blend of the three types of metal particles. A fine layer that "consists essentially of" coarse particles, fine particles, and metal fiber particles, contains these three types of particles and not more than an insignificant amount of any other material (such as a different type of particle), e.g., not more than 5, 3, 1, 0.5, or 0.1 weight percent of any other material (such as a different type of particle).

A sintered metal body can include (i.e., comprise, consist of, or consist essentially of) the first layer and the second layer, as described. The total body thickness, and the relative thicknesses of the first and second layers of a body can be any that are useful. A first layer may have a thickness that will provide a support for the second layer without unduly restricting fluid flow through the body. The second layer may have a thickness that provides desired filtering performance, and that also provides good strength in a membrane, especially a tubular membrane.

A total thickness of a porous sintered body for use as a filter membrane can be relatively thin, e.g., have a thickness that is relatively small in magnitude. A thin filter membrane can result in certain desired properties of a filter membrane including reduced mass and a reduced pressure drop across the filter during use. Examples of useful or preferred porous sintered bodies adapted for use as a filter membrane, e.g., for filtering a supercritical fluid, can have a thickness that is below 1.5 or 2 millimeters, e.g., below 1, 0.9, or 0.8 millimeters, e.g., in a range from 0.4 to 1 millimeter.

In examples porous sintered bodies a first (coarse) layer may be either thicker or thinner than a second layer. According to certain examples, a body as described can have a first (coarse) layer thickness that is at least 50 percent of a total thickness of the body, e.g., at least 55, 60, 70, or 80 percent of the total thickness of the body. The second layer can have a thickness that is up to (i.e., not more than) 50 percent of a total thickness of the body, such as up to 20, 30, 40, 45, or 50 percent of a total thickness of the body.

The porous sintered body contains the first layer, the second layer, and may also contain but does not require other layers or materials. According to certain embodiments a porous sintered body may be made to consist of or to consist essentially of only the first and second layers. A porous sintered body that "consists essentially of" the first layer and the second layer contains these two layers and not more than an insignificant amount of any other layer or material, e.g., not more than 5, 3, 1, 0.5, or 0.1 weight percent of any other layer or material.

A filter membrane made of a porous sintered body as described can include a useful surface area through which fluid flows, which can preferably be sufficiently high to allow for desired filtering performance features during use such as a low pressure drop, a desirable flow rate of fluid through the filter, and a desired removal efficiency (as measured by LRV). Exemplary porous sintered bodies can be constructed into a filter membrane that is in the form of a flat sheet, or alternately as a three-dimensional shape such as in the form of a cup, cone, an open tube (open at two opposed ends), or closed-end tube (a.k.a. "closed cylinder," meaning a tube or cylinder having one closed end and one open end). A particular example of a filter body useful for filtering supercritical carbon dioxide can be an open cylinder filter membrane, i.e., a tube, having a length in a range from 10 to 100 millimeters, and a diameter in a range from 0.5 to 2 inches, such as in a range from 0.75 to 1.5 inches.

A porous body of the description can have a bubble point that is useful to allow the body to be effective in filtering a fluid, for example a supercritical fluid such as supercritical carbon dioxide. Examples of useful or preferred bubble points of a membrane can be at least 200 kilopascals (kPa) for example at least 225 or 250 kPa, measured by bubble point test method ASTM F316, using isopropyl alcohol (IPA).

A porous body as described, prepared and used as a filter membrane, e.g., for filtering supercritical carbon dioxide, will exhibit filtering properties and flow properties that are comparable to or improved relative to previous porous metal filter membranes. Filter membranes as described, particularly tubular filter membranes, can advantageously exhibit increased strength relative to previous, comparable porous metal filter membranes that do not included the two specific layers described herein, made from the specified metal particles. Without being bound by theory, the metal fiber particles of the second layer physically contact and directly and indirectly connect with a large number of other particles in the fine layer to form a strengthened fused particle network in the second layer. A metal membrane as described that contains a first (coarse) layer and a second (fine) layer, with the fine layer containing fiber particles as part of a fused particle network, exhibits increased strength (objectively, based on testing such as burst strength testing) compared to a comparable metal membrane made from the same coarse layer but with a fine layer that contains coarse particles and fine particles in comparable relative amounts but without metal fiber particles.

A porous sintered body as described can be used as a filter membrane to remove particles or contamination from a flow of fluid directed through the filter membrane. The fluid may be any type of fluid, including a gas, a liquid, or a supercritical fluid. The fluid may be any fluid that requires filtering, including as a particular example superfluid carbon dioxide that contains an impurity at a low level, from any source. Supercritical carbon dioxide is useful for processing or fabricating semiconductor and microelectronic devices. The porous sintered body may effectively remove contaminants from a fluid stream by a sieving or a non-sieving filtration mechanism, or both. When the fluid is a supercritical carbon dioxide, filtration may predominantly occur by a non-sieving filtration mechanism.

The pressure of a fluid that is handled by a filtering system during a step of filtering the fluid using a filter membrane as described can be as desired. For methods and equipment used to filter certain types of fluids, including supercritical carbon dioxide, the pressure of a fluid within a filtering system, e.g., as the fluid passes through a filter membrane, is relatively high, such as at least 10, 20, or up to or in excess of 30 megapascal (MPa).

A pressure differential (or "pressure drop") across a thickness of a filter membrane as described (between an upstream side of the filter and a downstream side of the filter), during use of the filter membrane, can be any pressure differential that allows for desired effectiveness (e.g., particle retention) during the filtering step (e.g., of a given flow rate of fluid), and that is also commercially feasible. For use to filter supercritical carbon dioxide, at elevated pressure, a differential across the filter membrane can be at least 1, 2, or 3 megapascal (MPa).

The amount of a fluid that flows through a filter membrane (volume through the filter per time) during a filtering step can be an amount that allows for desired effectiveness (e.g., particle retention) during the filtering step, and that is also commercially feasible.

The temperature of a flow of fluid through a filter membrane as described can be any temperature that allows for commercially effective filtering. For filtering supercritical carbon dioxide, a temperature may be relatively high, such as a temperature of at least 100, 150, or 200 degrees Celsius.

A sintered metal body as described can be prepared by a multi-step process of forming a precursor that contains a first layer and the second layer as described, followed by sintering the precursor to cause the particles of the layers to bond together to form a porous sintered body. In certain example methods, a precursor can be formed by dry methods that use dry powders of metal particles, without the need for any polymer or other liquid component being present within the powder. A first layer of a precursor can be formed by molding the first layer from a first dry powder of coarse metal particles to form a first layer green body, e.g., using an isotactic molding technique. After a first layer green body is formed, a dry powder that contains the blend of three different metal particles as described for a second layer (coarse particles, fine particles, and metal fiber particles), is applied uniformly to a surface of the first layer green body and compressed against the surface, again by an isotactic molding technique. The resultant green body, having a first (coarse) layer and a second (fine) layer, is then sintered to produce a sintered porous body having a first and a second layer as described herein.

According to one example step, a collection of particles in the form of a dry powder that includes mostly or entirely coarse particles is molded under pressure to compress the particles to form a thin membrane. By one technique, the molding step can be of a type referred to as isotactic molding, or isotactic wet pressure molding. (See, e.g., U.S. Pat. No. 7,534,287, the entirety of which is incorporated herein by reference.) The membrane that is produced, which contains mostly or entirely coarse particles compressed together by the molding step, will become a first layer of a porous sintered body. The thin membrane is held together by the contact produced between the particles by the compression of the particles. The thin membrane, referred to as a "precursor" or a "green body," which specifically here is a "first layer precursor," is self-supporting yet fragile.

A second collection of particles is formed as a blend of the three types of metal particles described herein as useful for a second layer, the blend including: coarse particles, fine particles, and metal fiber particles. This blend of particles is then applied to one surface of the first layer precursor in a manner to place a uniform and even amount of the blend over the surface of the first layer precursor. Effective methods of applying the blend of particles to the surface of the first layer precursor are known, and include methods referred to as "air laying" techniques, such as by placing a screen or mesh over the surface of the first layer, then passing the blend of particles through the screen, optionally with the use of a brush for evenly distributing the particles.

After evenly placing the blend of particles over the surface of the first layer, the resultant body is again molded under pressure to compress the particles of the blend to form the second layer compressed onto the surface of the first layer. Molding and compressing the blend of particles onto the surface of the first layer can be performed by an isotactic molding technique, e.g., an isotactic wet pressure molding technique. The resulting precursor ("green body") contains the compressed and non-sintered first layer made from the coarse particles, and the compressed and sintered second layer made from the blend that contains at least three types of particles. In a subsequent step, the precursor is sintered at a sintering temperature that will be effective to bond the particles of both layers into a single porous sintered body.

EXAMPLES

In the following example method, an example porous sintered body of the present description was prepared. The body was made using a stainless-steel alloy, preferably 316L, but the method of making the body may be used with other metals and alloys for which particles of suitable size and morphology are available. 316L is selected due to good compatibility with carbon dioxide gases, which might have trace amounts of carbon monoxide (CO), because nickel (Ni) atoms in the in 316L alloy are securely bound in the alloy and will not react with the carbon monoxide.

The particles used to produce the body consist of three different powders, and one type of fiber (all 316L).
Powder Material 1:

The base, or more porous support layer, i.e., the "first layer" of a porous sintered body, should have a relatively higher porosity compared to the filtration layer, i.e., the "second layer." To achieve a desirably high porosity, a powder that has a low apparent density (e.g., less than 1.5 g/cc for SS) can be used to form the first layer. The size range of particles of the first layer may be in a range of from 1 to 10 microns. However, these materials themselves often have apparent density in the 2-3 g/cc range, too large to produce a desirably high porosity (e.g., a porosity of greater than 50 percent). Therefore, the apparent density of the particles can be reduced by a useful method of changing the shape, size, or morphology of the particles, for example as is described in U.S. Pat. No. 5,814,272, "Method for forming Dendritic metal powders." A useful non-dendritic powder can be processed by such a method to produce a powder of dendritic particles that has an apparent density in a range of approximately 1 to 1.5 g/cc.
Powder Material 2:

Powder Material 2 is the same raw material as used in Powder Material 1, but is not treated to reduce the apparent density of the raw material particles. Powder Material 2 is blended with Powder Material 3 and Fiber Material 1 to form a blend of particles used to prepare the fine filtration layer ("second layer").
Powder Material 3

Powder material 3 is a powder of nanoscale particles having particle sizes in the 50-200 nanometer range.
Fiber Material 1

Fiber Material 1 is a powder made of metal fiber particles having 1.5 um diameter and 50-200 um length. Fiber Material 1 is blended with Powder Material 2 and Powder Material 3 to produce a powder blend used to prepare the fine layer, that is effective as part of the porous sintered body as to perform filtration of particles on a nanometer scale, e.g., at a scale of from 10 to 20 nanometers.

The purpose of the fiber particles is similar to the purpose of fiber reinforcement in concrete, which is to increase strength of the porous sintered body and to prevent cracking of the fine layer during the fabrication and sintering process.

To prepare a porous sintered body, a green form (i.e., "green body" or "precursor") of Powder Material 1 (the "first green body") in the shape of a tube is fabricated using conventional wet bag isostatic pressing. While the resultant precursor is fragile, it is self-supporting and coherent.

Separately, Powder Material 2 is blended with a small portion of Fiber Material 1 (generally the fiber is 1-10 percent by mass of the second fine filtering layer) to achieve a uniform blend of the particles. A useful blending process is described in US patent application US20130305673A1, the entire content of which is incorporated herein by reference. The result is referred to as a powder/fiber blend.

The powder/fiber blend is then carefully blended with Powder Material 3, the nanoscale particles, to produce the "second layer blend." The amount (mass proportion) of Powder Material 3 that is added to the powder/fiber blend can be determined based on the desired final membrane properties, namely pore size and permeability of the porous sintered body. Increasing the mass percent of the Powder Material 3 will tend towards a smaller pore size and lower permeability of the resultant porous sintered body.

The first green body is placed into tooling that has an inside diameter that is identical to or nearly identical to (e.g., slightly larger than) the inner diameter of the mold used during isostatic pressing to form the first green body. In specific, the tooling includes a sold steel inner mandrel and an exterior rubber isostatic bag. An annular void space is present between the outer surface of the tube of the first green body, and an inner surface of the isotactic bag. The size (inner diameter) of the isostatic bag can be selected to produce a void space of a desired size, to increase or decrease the thickness or density of the second layer, when the second layer blend is compressed against an outer surface of the first green body.

A second green body is formed using the first green body, forming a second layer made from the second layer blend at an outer surface of the first green body. (The first green body is not sintered before the second layer is formed on the first green body.) The annular void described above may be filled with the second layer blend, followed by a step of compressing the second layer blend against the first green body to form an un-sintered second layer. A useful process is described in U.S. Pat. No. 7,534,287 B2, the entirety of which is incorporated herein by reference.

This second green form is formed by compressing the second layer blend against the first green body at a pressure that is substantially higher than a pressure used to form the first green body. The second green form, while strong and quite coherent, is still fragile and can be broken by hand. It includes the first and the second layers, each non-sintered: an inner "support" layer (a "first layer" as described) and an outer "nanolayer" filtration layer (a "second layer" as described).

Given the size constraints of intended semiconductor tool plumbing systems, a size of a tubular filter membrane may be generally in the 2 to 3 cm diameter range, with a length being typically less than 10 cm.

The second green body can be sintered, preferably at a sintering temperature that is as low as possible and of sufficient duration to create the needed sinter bonds to form a cohesive well-sintered porous body. The sintering temperature is low to prevent the bulk melting of the nanoscale material (fine particles), whose high surface area greatly lowers the temperature required to initiate melting.

A sintering temperature that is useful for sintering for a particular precursor will depend on the types of particles of the precursor, including the sizes, shapes, and chemical compositions of the different particles of a precursor. For powder and fiber materials discussed here, e.g., made of stainless steel, useful sintering conditions can include a combination of a hydrogen and vacuum environment, and a sintering temperature generally in a range from 900 to 1100 degrees Celsius. A duration of a useful sintering step at a temperature in this range may be approximately 20 minutes to a few hours.

The presence of the "larger" powder (Powder Material 2) in the second layer blend, in addition to helping to define the pore size and permeability of the second layer, also assists in controlling the sintering rate of the fine (nano-scale) particles of the second layer blend, so that the second layer blend behaves during sintering in a fashion similar to the base layer, which is made of the reduced apparent density coarse particles also of a micron-scale.

A maximum pore size of the resultant porous sintered body can be determined by an IPA bubble point test.

Permeability of the resultant porous sintered body can be measured using an air or water permeability test and the pore size distribution can be measured using a Porosimetry test.

The filter membrane and appurtenant housing can be designed and useful to operate in high-pressure ranges required for filtering a supercritical fluid such as supercritical carbon dioxide. With the permeability of a filter membrane being known, and with temperature and pressure conditions being known, as well as a desired volumetric or mass flow rate being know, the pressure difference required to sustain a desired flow of the fluid through the filter membrane can be calculated.

The filter membrane may be included in a filtering system or apparatus that includes a filter housing that contains and supports the filter membrane at a location of a fluid flow, to cause the fluid to flow through the membrane when the fluid passes through the filter housing. The filter housing can have an inlet, an outlet, and an internal volume that contains the filter membrane.

Figure 3:
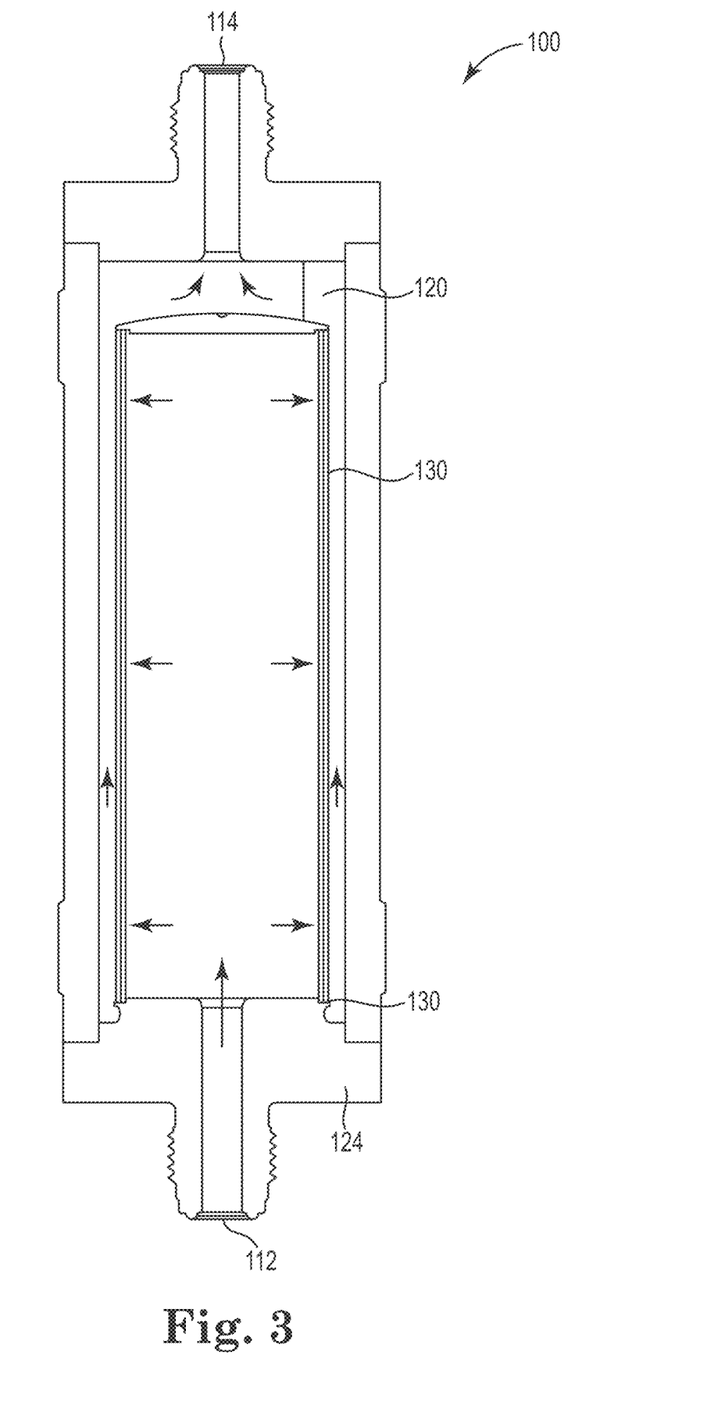
FIG. 3 shows an example of a filter assembly as described, that include a filter housing and a multi-layer porous sintered body.

An example of a filter housing (in cross-section) is shown at FIG. 3. Example filter housing 100 includes housing body 110, fluid inlet 112, fluid outlet 114, and interior 120. Tubular multi-layer porous sintered body 130 is contained at interior 120, for example by being welded to housing base 124 at weld 130. In use, fluid (not shown) flows as indicated by the arrows into inlet 112, through filter membrane 130, through interior 120, and exits the filter housing through outlet 114.

A tubular filter membrane must be able to withstand a differential pressure used in a supercritical carbon dioxide filtering process, without being ruptured, distorted, and without exceeding its yield strength. A simple way of determining the strength of a porous sintered tubular filter membrane is to cause the membrane to burst, either by pressurizing the interior or exterior while keeping the opposite side at a constant low pressure (such as at atmospheric pressure). A factor of safety can be applied to this burst pressure; typically a tubular filter membrane may be recommended for use at a pressure that is not greater than one-third (⅓) of a tested burst pressure for the membrane, but the recommended use pressure can vary.

In example uses, a filter membrane as described can be designed for use in a process of filtering a supercritical fluid, which varies widely in properties, including phase (liquid/gas/supercritical and potentially solid) as a result of changing temperature and pressures. The viscosity of the fluid also varies widely, with a more viscous fluid requiring more pressure force to maintain flow than a less viscous state. An added challenge is due to rapid pressure changes that occur during opening of valves, orifices, etc., between two volumes of a fluid-handling system that have significantly different pressures, within a system connected to the filter membrane. For example, the filling of a process chamber which is at atmospheric pressure with a supercritical fluid at several megapascals, can create a significant pressure change in the system. It is possible to initiate a "soft start" that will gradually increase pressure within the system, but it is preferred in semiconductor fabrication processes, from a cost and time perspective, to fill the chamber as rapidly as possible.

A filter membrane as described can be designed to withstand such conditions, to be useful in methods of filtering supercritical carbon dioxide.

Strength

For comparative purposes, the strengths of cylinder-shaped filter membranes as described were tested and compared to measured strengths of non-inventive (prior art) filter membranes. To accomplish this, cylinder-shaped (tubular) porous membranes were subjected to internal pressure, and the pressure at which each cylinder ruptured was measured.

For samples of varying dimensions, the simplified formula for thin wall cylinder hoop stress can be used (thin walls required a diameter to thickness ratio of >20) to determine the Hoop Stress at Burst:

Hoop Stress at Burst=Burst Pressure*Diameter/ (2*thickness)

The tubes are prepared for burst by first injecting slurry of fine dust (below 20 um particle size) into the interior of the tube, effectively blocking the pores of the porous membrane. Water pressure was then applied and increased to the interior until the cylinder ruptured. The pressure at which rupture occurred was recorded as the Burst Pressure, and the calculated Hoop stress is called the "Hoop Stress at Burst."

A preferred membrane as described in the form of an open-ended tube, may have a hoop stress at burst that is at least 30,000 psi, at least 35,000 psi, or at least 40,000 psi, for example in a range from 30,000 to 50,000 psi, 30,000 to 45,000 psi, 30,000 to 40,000 psi, 35,000 to 50,000 psi, 35,000 to 45,000 psi, 40,000 to 50,000 psi or any and all ranges and subranges there between.

A tube-shaped porous body of the present description, as tested, had a diameter of approximately 17 mm and a membrane thickness of 0.56 mm (⅓ of the thickness is the second layer made of a blend of the coarse particles, fine particles, and metal fiber particles). The sample had a length of 35 mm (immaterial to the hoops stress calculations). It was pressurized and burst at a pressure of 2900 psi.

A tube element prepared as described in U.S. Pat. No. 7,534,287 B2 of near identical dimensions was similarly tested and ruptured at a pressure of 1678 psi.

Because Hoop stress is directly proportional to the burst pressure it can be seen that the Hoop stress at burst of the present disclosure is more than two times higher than the Hoop stress at burst of the prior art tubular membrane.

The doubling of the material strength allows for increasing the applied differential pressure during operation and achieving higher flow rate. It also enables increasing the diameter of the filter cylinder by >2× and maintaining the same Hoop stress at burst (provided the thickness remains the same). A tubular filtration membrane of the present description can be constructed with a relatively surface area and can operate at a relatively higher differential pressures compared to membranes that exhibit a lower strength.

|  | Comparative US 7,534,287 | Present Disclosure (same dimensions) | Present Disclosure (larger Dimensions) |
| --- | --- | --- | --- |
| Diameter-mm | 16.76 | 16.76 | 28.45 |
| Thickness-mm | 0.60 | 0.60 | 0.60 |
| Length-mm | 35.00 | 35.00 | 75.00 |

-continued

|  | Comparative US 7,534,287 | Present Disclosure (same dimensions) | Present Disclosure (larger Dimensions) |
|---|---|---|---|
| Burst pressure-PSI | 1678 | 2900 | 1700 |
| Hoop stress at burst-PSI | 23442 | 40513 | 40301 |
| Hoop stress at burst-MPa | 162 | 279 | 278 |
| Maximum Allowable operating differential pressure-Mpa (4 × factor of safety to burst) | 2.85 | 4.93 | 2.89 |
| Membrane Surface area-cm$^2$ | 18.43 | 18.43 | 67.02 |

The data show that a tube-shaped membrane having a second layer that contains coarse particles, fine particles, and metal fiber particles exhibits improved strength, measured as hoop stress at burst, compared to a similar tube-shaped membrane having a second layer that does not contain metal fiber particles.

In a first aspect, a tubular porous membrane comprises: a first layer comprising sintered metal particles, a second layer comprising a combination of sintered metal particles comprising metal fiber particles; and the membrane has a hoop stress at burst that is at least 30,000 psi.

Also disclosed is a second aspect according to the first aspect, wherein the second layer comprises coarse metal particles having a particle size of at least 1 micron, metal fiber particles, and fine metal particles having a particle size below 200 nanometers.

In a third aspect, a porous membrane comprises a first layer comprising coarse metal particles having a particle size of at least 1 micron, a second layer comprising a combination of sintered metal particles comprising: coarse metal particles having a particle size of at least 1 micron, metal fiber particles, and fine metal particles having a particle size below 200 nanometers.

Also disclosed is a fourth aspect according to the second or third aspect, wherein the coarse metal particles having a particle size in a range from 2 to 5 microns.

Also disclosed is a fifth aspect, according to any of the second through fourth aspects, wherein the fine metal particles having a particle size in a range from 60 to 100 nanometers.

Also disclosed is a sixth aspect according to an preceding aspect, wherein the metal fiber particles having an aspect ratio (length:diameter) of at least 25:1.

Also disclosed is a seventh aspect according to any of the second through sixth aspects, the second layer comprising a combination of sintered metal particles comprising: at least 30 weight percent coarse metal particles, at least 30 weight percent fine metal particles, and less than 20 weight percent metal fiber particles.

Also disclosed is an eighth aspect according to any of the second through sixth aspects, the second layer comprising a combination of sintered metal particles comprising: from 40 to 60 weight percent coarse metal particles, at least 40 to 60 weight percent fine metal particles, and from 0.5 to 8 weight percent metal fiber particles.

Also disclosed is a ninth aspect according to any of the second through sixth aspects, the second layer comprising a combination of sintered metal particles comprising: from 40 to 60 weight percent coarse metal particles, at least 40 to 60 weight percent fine metal particles, and from 1 to 6 weight percent metal fiber particles.

Also disclosed is a tenth aspect according to any of the second through ninth aspects, wherein: the coarse metal particles of the first layer are stainless steel, the coarse metal particles of the second layer are stainless steel, the metal fiber particles are stainless steel, and the fine metal particles are stainless steel.

Also disclosed is an eleventh aspect according to any of the preceding aspects having a bubble point that is at least 275 kilopascals as measured by ASTM F316, measured by using isopropyl alcohol (IPA).

Also disclosed is a twelfth aspect according to any of the third through eleventh aspects, wherein the coarse particles of the first layer are dendritic.

Also disclosed is a thirteenth aspect according to any of the third through twelfth aspects, wherein the coarse particles have an apparent density in a range from 1.0 to 1.5 grams per cubic centimeter.

Also disclosed is a fourteenth aspect according to any of the preceding aspects, wherein the thickness of the membrane is in a range from 0.4 to 1 millimeter.

Also disclosed is a fifteenth aspect according to any of the preceding aspects, wherein the second layer has a thickness that is in a range from 10 to 50 percent of a total thickness of the membrane.

Also disclosed is a sixteenth aspect according to any of the third through fifteenth aspects, wherein the membrane comprises a tube.

Also disclosed is a seventeenth aspect according to the sixteenth aspect, wherein the membrane has a hoop stress at burst that is at least 30,000 psi.

Also disclosed is an eighteenth aspect according to the first, second, sixteenth, or seventeenth aspects, the tube having a diameter in a range from 0.75 to 1.5 inches.

In a nineteenth aspect a filter assembly comprises a filter housing that contains a filter membrane of any of the preceding aspects.

In a twentieth aspect, a method of processing supercritical carbon dioxide, comprises passing supercritical carbon dioxide through a membrane of any of the first through eighteenth aspects.

Also disclosed is a twenty-first aspect according to the twentieth aspect, wherein the coarse metal particles of the first layer consist essentially of stainless steel, the coarse metal particles of the second layer consist essentially of stainless steel, the metal fiber particles consist essentially of stainless steel, and the fine metal particles consist essentially of stainless steel.

Also disclosed is a twenty-second aspect according to the twentieth or twenty-first aspect, wherein a pressure differential across the membrane is at least 1 megapascal.

In a twenty-third aspect, a method of forming a multi-layer porous membrane comprises preparing a first precursor comprising coarse metal particles having a particle size of at least from 1 micron, preparing a multi-layer precursor by applying a blend of metal particles to a surface of the first precursor, the blend comprising: coarse metal particles having a particle size of at least 1 micron, metal fiber particles, and fine metal particles having a particle size below 200 nanometers, and sintering the composite precursor.

Also disclosed is a twenty-fourth aspect according to the twenty-third aspect, wherein the coarse metal particles having a particle size in a range from 2 to 5 microns.

Also disclosed is a twenty-fifth aspect according to the twenty-third or twenty-fourth aspects, wherein the fine metal particles having a particle size in a range from 60 to 100 nanometers.

Also disclosed is a twenty-sixth aspect according to any of the twenty-third to twenty-fifth aspects, wherein the metal fiber particles having an aspect ratio (length:diameter) of at least 25:1.

Also disclosed is a twenty-seventh aspect according to any of the twenty-third to twenty-sixth aspects, wherein the membrane consists essentially of stainless steel.

Also disclosed is a twenty-eighth aspect according to any of the twenty-third through twenty-seventh aspects, wherein the coarse particles of the first precursor are dendritic.

Also disclosed is a twenty-ninth aspect according to any of the twenty-third through twenty-eighth aspects, wherein the coarse particles of the first precursor have an apparent density in a range from 1.0 to 1.5 grams per cubic centimeter.

The invention claimed is:

1. A tubular porous membrane comprising:
    a first layer comprising sintered metal particles;
    a second layer comprising a combination of sintered metal particles comprising coarse metal particles having a particle size of at least 1 micron, metal fiber particles, and fine metal particles having a particle size below 200 nanometers; and
    the membrane has a hoop stress at burst that is at least 30,000 psi.

2. The membrane of claim 1, the second layer comprising a combination of sintered metal particles comprising:
    at least 30 weight percent coarse metal particles,
    at least 30 weight percent fine metal particles, and
    less than 20 weight percent metal fiber particles.

3. The membrane of claim 1, wherein the metal fiber particles have an aspect ratio (length:diameter) of at least 25:1.

4. The membrane of claim 1, having a bubble point that is at least 275 kilopascals as measured by ASTM F316, measured by using isopropyl alcohol (IPA).

5. The membrane of claim 1, wherein the thickness of the membrane is in a range from 0.4 to 1 millimeter.

6. The membrane of claim 1, wherein the second layer has a thickness that is in a range from 10 to 50 percent of a total thickness of the membrane.

7. The membrane of claim 1, having a diameter in a range from 0.75 to 1.5 inches.

8. A filter assembly comprising a filter housing that contains the membrane of claim 1.

9. A method of processing supercritical carbon dioxide, the method comprising passing supercritical carbon dioxide through the membrane of claim 1.

10. A porous membrane comprising:
    a first layer comprising coarse metal particles having a particle size of at least 1 micron; and
    a second layer comprising a combination of sintered metal particles comprising:
        coarse metal particles having a particle size of at least 1 micron, metal fiber particles, and
        fine metal particles having a particle size below 200 nanometers.

11. The membrane of claim 10, wherein the metal fiber particles have an aspect ratio (length:diameter) of at least 25:1.

12. The membrane of claim 10, the second layer comprising a combination of sintered metal particles comprising:
    at least 30 weight percent coarse metal particles,
    at least 30 weight percent fine metal particles, and
    less than 20 weight percent metal fiber particles.

13. The membrane of claim 10, having a bubble point that is at least 275 kilopascals as measured by ASTM F316, measured by using isopropyl alcohol (IPA).

14. The membrane of claim 10, wherein the coarse particles of the first layer are dendritic.

15. The membrane of claim 10, wherein the coarse particles have an apparent density in a range from 1.0 to 1.5 grams per cubic centimeter.

16. A filter assembly comprising a filter housing that contains the membrane of claim 10.

17. A method of processing supercritical carbon dioxide, the method comprising passing supercritical carbon dioxide through the membrane of claim 10.

18. A method of forming a multi-layer porous membrane, the method comprising:
    preparing a first precursor comprising coarse metal particles having a particle size of at least from 1 micron; and
    preparing a multi-layer precursor by applying a blend of metal particles to a surface of the first precursor, the blend comprising:
        coarse metal particles having a particle size of at least 1 micron, metal fiber particles, and
        fine metal particles having a particle size below 200 nanometers, and sintering the composite precursor.

19. The method of claim 18, wherein the metal fiber particles have an aspect ratio (length:diameter) of at least 25:1.

* * * * *